United States Patent [19]

Norlander

[11] Patent Number: 5,074,092
[45] Date of Patent: Dec. 24, 1991

[54] LAMINATED WOOD PRODUCT

[75] Inventor: Norman E. Norlander, Puyallup, Wash.

[73] Assignee: Weyerhaeuser Company, Tacoma, Wash.

[21] Appl. No.: 387,924

[22] Filed: Jul. 31, 1989

[51] Int. Cl.⁵ ............................ B32B 3/14; E06B 3/74
[52] U.S. Cl. ......................................... 52/455; 428/50; 52/573; 52/730
[58] Field of Search ................. 428/44, 45, 49, 50; 52/291, 455, 456, 573, 730

[56] References Cited

U.S. PATENT DOCUMENTS

| | | | |
|---|---|---|---|
| 2,324,628 | 7/1943 | Kahr | 428/50 |
| 2,444,343 | 6/1948 | Eisinger | 428/50 |
| 3,761,336 | 9/1973 | Quinif | 428/50 |

Primary Examiner—John E. Murtagh

[57] ABSTRACT

The invention is a laminated wood product having superior appearance and dimensional stability. It has a core member of common lumber. This core member has been relieved in one of a number of ways to reduce or eliminate warping induced by internal stresses. Preferably this is accomplished by making kerfs in the edges or in the faces which extend almost completely through the product. Sheets of patched or otherwise relatively defect-free veneer are then laminated to each face of the core member. These prevent telegraphing of core defects and kerfs. A piece of clear or otherwise acceptable appearance grade lumber is then laminated to each edge of the product. Ultimately, appearance grade veneer is laminated to each face to create an assembly giving the appearance and utility of clear, solid sawn wood.

13 Claims, 2 Drawing Sheets

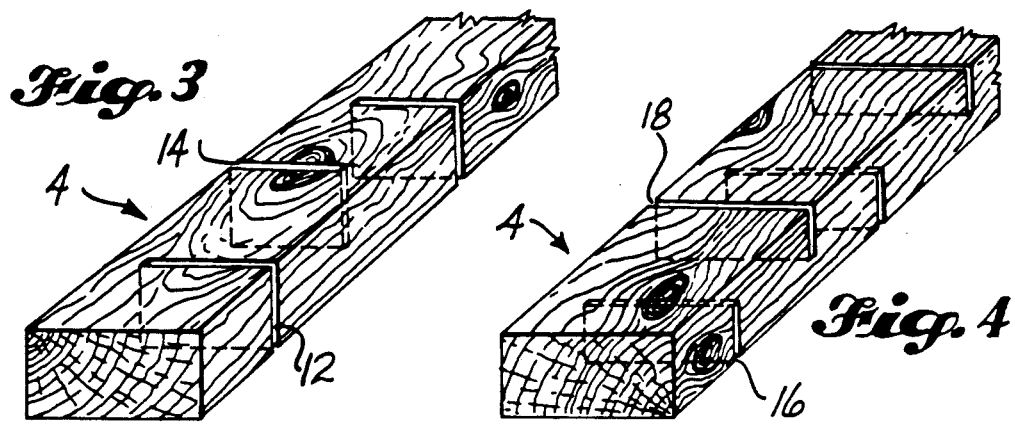
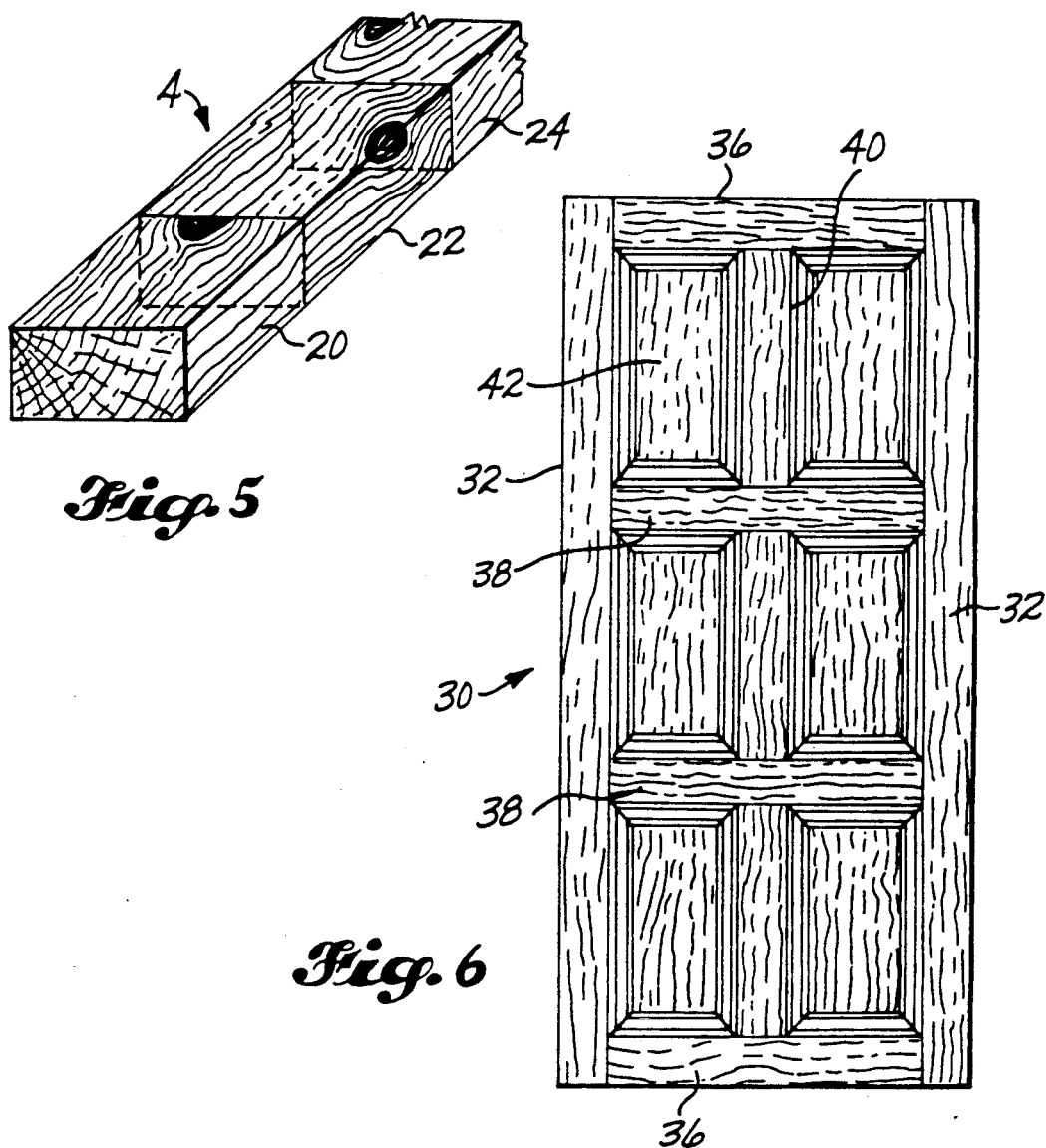

LAMINATED WOOD PRODUCT

BACKGROUND OF THE INVENTION

The present invention is a laminated wood product for use where good appearance and dimensional stability are of paramount importance. The product is particularly useful for stiles and rails of paneled doors where it gives the appearance of high grade solid sawn lumber. The product is further characterized by excellent dimensional stability and freedom from warpage.

The availability of good appearance grade lumber products is becoming poorer and poorer as the last of the available old growth western timber is being harvested. Forest products manufacturers have responded to this problem in a number of ways, one of which has been the import of tropical woods. Another way has been to end and/or edge joint smaller pieces of wood into larger standard size units. Both of these approaches have problems in their own right. The clear wide lumber cut from tropical trees is expensive, often lacking in desirable or necessary physical properties, and tends to have a very bland grain pattern. The edge and end glued products lack continuity of grain pattern so that it is almost essential for them to be finished in opaque paints. Very often, despite the best care during manufacture, the joints themselves will also telegraph through the painted surface. A third approach has been the lamination of a number of pieces of wood so as to simulate a single piece of solid sawn lumber. The use of laminated lumber of this type appears to be especially directed to stiles and rails for paneled doors. Until now this application has required clear lumber of the highest quality.

One laminated wood product of the type noted above, while not intended for use in door stiles, is shown in FIG. 2 of Clark, U.S. Pat. No. 3,445,325. Turner, in U.S. Pat. Nos. 4,702,054 and 4,704,834, shows a rather complex paneled door in which the stiles, rails, and panels are all made of laminated members intended to simulate solid wood. The stiles and rails are strips applied to both faces of a plywood core which is coextensive over the entire area of the door. The openings around the panels are edged in decorative moldings and all of the raised surfaces may be covered with a thin wood veneer. This door is said to be more secure, fire tight, and less resistant to separation and loosening of the panels. As described in the patent, a standard six-panel door would require 79 individual pieces of wood without even considering the face veneers.

Hagemeyer, in U.S. Pat. No. 4,716,700 describes what he calls "plantons." These are add-on panels to give a flush door the appearance of a panel door. The portions simulating stiles and rails, perhaps best seen in FIGS. 8 and 9, are complex constructions of cross banded veneers which also include an aluminum vapor barrier. As seen in FIG. 8, in some locations the construction comprises at least 13 individual laminae.

The above-noted door constructions should be compared with a standard six-panel door which is made of 15 individual pieces of wood. These are already considered by most wood workers to be of complex and expensive construction.

As the availability of high grade solid wood for stiles and rails decreases, so does the quality. Much of the material available now is from second growth trees which tend to have much more widely spaced annual rings than old growth timber. This wood is undesirable from two standpoints, one aesthetic and one functional. Most door stiles and rails are made of vertical or edge grain lumber; i.e., lumber cut generally along a radius of the log. Second growth lumber is more normally available only in flat grain or generally tangentially sawn lumber and its appearance is not as highly regarded. The second growth lumber has a more serious problem, however. It has a much greater tendency toward warpage than lumber from old growth logs. This warpage is usually manifested in one of three ways. These defects are known as twist, bow, and crook. Frequently some combination of these warpage defects is present.

Twist is a warpage defect which can be best visualized by imagining the shape a piece of lumber would assume if each end was tightly grasped and then twisted in opposite directions. Stated otherwise, the board tends to assume the configuration of a portion of a spiral.

In lumber with bow, the edges lie on parallel planes but the faces are curved. When laid on one of its faces, bow causes the lumber to be shaped like the rocker of a rocking chair.

Crook is deviation from linearity of the edges of a piece of lumber when it is laid on one of its widest faces and is warpage 90° displaced from bow. A piece of lumber having only crook will have the faces lying in parallel planes with the edges curved.

While grading rules set limits for warpage, a piece that is satisfactory at one moisture content may show unacceptable warpage at a slightly different moisture content. This problem, along with availability, presents a serious challenge to door manufacturers who wish to supply a quality product.

A further problem might be noted with some of the laminated structures described earlier. Very often the end grain of the various laminae are apparent either along the edges of the door itself or along the molded areas adjacent to the interior panels. While this does not necessarily detract from the performance of the doors, it is a feature which has met with considerable consumer resistance since it is visually unaesthetic.

The present invention is a lumber product which appears to overcome most or all of the above-noted objections, including the problems of appearance in laminated products and warpage in solid wood products.

SUMMARY OF THE INVENTION

The present invention is a laminated wood product having superior dimensional stability and appearance. It is especially well suited for use in the manufacture of door stiles and rails, but may be used in many other applications where clear lumber is now required. The product has a core member which is of generally rectangular cross section. The core will comprise at least 50% of the cross-sectional area of the product, most commonly 60% or more of the cross-sectional area. The core need not be an appearance grade lumber. More typically it will be inexpensive common lumber having a variety of knots and other defects. The core is modified so that it further comprises relatively short end-to-end units of wood which are mechanically sufficiently independent from each other so as to essentially eliminate any tendency for the ultimate product to deform due to warpage. The core may be specifically configured to reduce any tendency to develop crook, or bow, or both defects. Twist is also virtually eliminated. This may be accomplished in any one of three manners. The core may comprise a series of short end-to-end staves of uniform or random length. It may also comprise a piece of solid lumber which has been kerfed in one or both of two ways. One way, which is especially effective in controlling crook, may be termed edge kerfing in which cuts are made into the member from one narrow face through both wider faces of the core member. These cuts extend nearly the full width of the member. Preferably the kerfs are alternated so that one is cut from one edge and the adjacent one from the opposite edge. An alternate method could be termed face kerfing. Her the cuts are made into the member from one wide face through both narrower faces of the core member. As before, it is preferred that these kerfs be made from alternate sides. The remaining web of wood is sufficient so that the piece will remain unitary and can be readily handled. A first veneer sheet is then laminated to each of the wider dimensions of the lumber comprising the core. This may be readily done by placing a number of precut or prekerfed core pieces side by side and bonding a wide sheet of wood veneer to each of the faces. The resulting assembly is then ripped longitudinally along lines corresponding to the edges of the individual core members.

The veneer facing serves an important dual purpose. It rigidizes the core assembly and acts to prevent telegraphing of core defects or kerf lines through to the surface of the ultimate product.

After the veneer-faced core members are singulated, a relatively thin piece of clear wood is adhesively bonded to each edge. These edge pieces are of sufficient width so that they cover not only the edges of the core board but the edges of the bonded veneer as well. Preferably the resulting pieces are then very lightly surfaced to make sure that each face is planar and the product is of the desired dimensions.

Finally, thin veneers of good appearance are bonded to each face of the product. These veneers are normally very thin being in the range of about 1/10-1/20 inch (1.3-2.5 mm). Because they are so thin the edges of the face veneer are barely apparent along the edges of the ultimate laminated product.

It is an object of the present invention to provide a laminated wood product of excellent appearance and relative freedom from warpage.

It is another object to provide a laminated wood product particularly well adapted for use as door stiles and rails.

It is further object to provide a laminated wood product which is simple and easy to construct using readily available materials.

It is still a further object to provide a laminated wood product in which a major percentage of the cross-sectional area may be an inexpensive common lumber product of poor appearance.

These and many other objects will become readily apparent upon reading the following detailed description taken in conjunction with the drawings.

BRIEF DESCRIPTION OF THE DRAWINGS

FIGS. 3-5 show various core configurations for the laminated lumber product.

FIG. 6 is a representation of a six-panel door made using the product of the invention for stiles and rails.

DETAILED DESCRIPTION OF THE PREFERRED EMBODIMENTS

Figure 1:
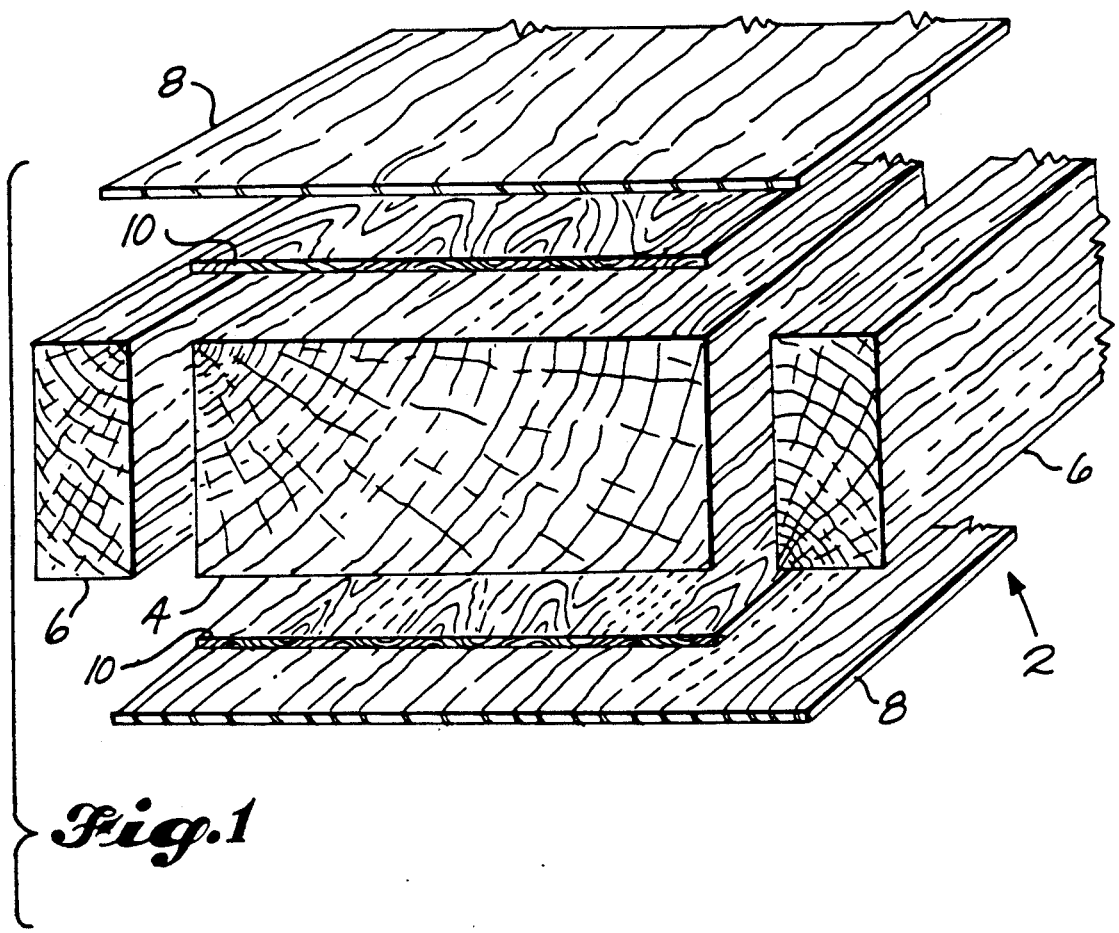
FIG. 1 is an exploded perspective view of the product of the invention.
Figure 2:
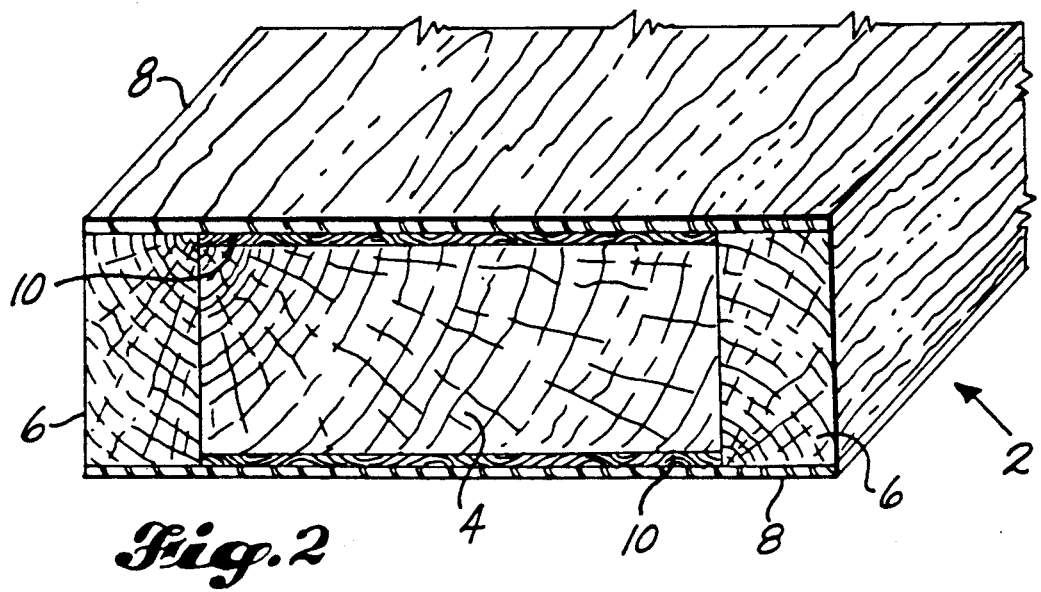
FIG. 2 shows the product of FIG. 1 in assembled form.

The construction of the present laminated lumber product can be readily understood by reference to FIGS. 1 and 2. The ultimate product 2 is comprised of a core 4 having bonded to each face a sheet of veneer 10 having a width equal to the width of the core member. This first veneer is preferably a rotary veneer which is either clear or in which the knots and other major defects have been patched. Relatively thin edge members 6 are then laminated to the edges of the veneer covered core. These edge members have a width equal to the combined thickness of the core and the two veneer sheets covering the faces. Members 6 are preferably clear or other appearance grade wood. It will be understood that small pin knots and other similar small defects are generally permissible and the term "clear wood" should be construed sufficiently broadly to include defects of this type. As a final step face veneers 8 are laminated to the just-described subassembly. These are normally a very thin appearance grade sliced veneer which will have a width equal to the width of the core 4 plus the two edge members 6. The assembled product, shown in exploded form 1, is seen in FIG. 2. It is apparent in FIG. 2 that the only way in which this product can be readily distinguished from solid sawn lumber is by the indistinct lines created by the face veneers along the edges of the product. Since these veneers are normally very thin, the lines they create will have minimum visibility.

A common exterior door stile thickness in the United States is 1 25/32 inches (45.2 mm). This thickness is readily achieved by using common dimension lumber of 1½ inch thickness (38.1 mm) and laminating to each face a sheet of 1/10 inch (2.54 mm) veneer. This member can then be very lightly surfaced to product a product having a thickness of 1.638 inches (41.6 mm).

Sliced veneers are available in a great many thicknesses, many of which tend to defy logical rhyme or reason. Veneers having a thickness of 1/14 inch (1.81 mm) are usually readily available. By laminating face veneers of this thickness to the product just described the final product will have the desired 1 25/32 inch thickness. The width of the product can be as desired and will either be controlled by the width of the core lumber or the width of the edge members or both. While door stiles vary in width, one very common door stile is 4⅞ inches (123.8 mm) wide. This width can be achieved by using a standard American two-by-four of 3½ inches (88.9 mm) actual width. Edge pieces totalling 1⅜ inches (34.9 mm) will bring the product to the 4⅞ inch width. There is no requirement for the edge members to be of equal thickness. It is quite possible and in some cases may be desirable to make one of greater thickness than the other.

FIGS. 3-5 show three different ways in which the core material may be treated to essentially eliminate any tendency to warp in the final laminated product. If the core is a continuous board, it may be kerfed in one of several ways. In FIG. 3 a series of edge kerfs 12, 14 are made. Preferably these are cut from alternate sides to within about 10 mm of the other edge. Kerfing the core wood in this manner is particularly effective in reducing any tendency toward crook in the product. Alternatively, as shown in FIG. 4, kerfs 16, 18 may be cut through the faces to within about 5 mm of the opposite face. Kerfing in this manner is very effective for reducing any tendency toward bowing.

Kerfing the core in the above manner essentially isolates it into individual units which are mechanically independent from each other and are not responsive to internal stresses caused by such things as moisture changes. The kerfs should be at intervals no greater than about 12 inches (300 mm) and are preferably made at intervals about half of this distance (approximately every 6 inches or 150 mm).

Complete isolation may be achieved with a core constructed as shown in FIG. 5 in which individual end-to-end staves 20, 22, 24 are used. These are not end glued but are held together in the final product by the veneer sheets 10 and the edge pieces 6.

It should be noted here that there is a product presently on the market being sold for use as door stiles which has some similarity to the product of the present invention. This uses core pieces as shown in FIG. 5 along with edge pieces and face veneers as is shown in FIG. 2. However, it lacks the intermediate veneer sheets 10 which are important to prevent telegraphing of defects in the core staves and in the joints between the staves. Use of the individual core pieces is a more difficult and expensive way of making the product compared with using kerfed cores as shown in FIGS. 3 or 4.

A paneled door 30 is shown in FIG. 6. This consists of a pair of stiles 32, end rails 36, intermediate rails 38 and muttons 40, only one of which is numbered. These form a framework for the six panels 42.

It will be evident that the uses of the present product are not limited to the manufacturer of doors. The product may be used in most applications where clear lumber is required including any where the interior construction would not be objectionably exposed if the product was ripped lengthwise. Further, it will be apparent that when a solid core member is used, the kerfs can be cut in many ways other than the preferred configurations shown in the drawings. The scope of the invention should thus be limited only as it is defined in the following claims.

I claim:

1. A laminated lumber product which consists essentially of:
   a core member of generally rectangular cross section so as to have two wider faces and two narrower edges, said core member comprising at least 50% of the cross sectional area of the product, said core member further comprising longitudinally end-to-end oriented units of wood mechanically sufficiently independent from each other so as to essentially eliminate any tendency for the product to deform due to warpage;
   first veneer sheets overlying and having one major surface bonded to each wider face of the core member, said first veneer sheets being rotary cut;
   relatively thin longitudinal edge pieces of good appearance bonded to the narrower edges of the core member and to the longitudinal edges of the first veneer sheets; and
   thin sliced face veneers of good appearance bonded to the other major face of each veneer sheet and to the longitudinal edge pieces, the first veneer sheets serving to strengthen the core member and prevent defects on the wider faces of the core member from telegraphing through to the face veneer, said wood product having superior dimensional stability and the appearance of high grade solid sawn lumber.

2. The laminated wood product of claim 1 in which the core member comprises separate end-to-end wood units.

3. The laminated wood product of claim 1 in which the end-to-end wood units are unbonded at the adjoining ends.

4. The laminated wood product of claim 1 in which the core member comprises a single wood unit transversely kerfed at intervals no greater than about 300 mm.

5. The laminated wood product of claim 4 in which the kerfs are cut into the member from one narrow face and through both wider faces of the core member.

6. The laminated wood product of claim 5 in which the kerfs alternate so that one is cut from the narrow edge and the adjacent one from opposite narrow edge.

7. The laminated wood product of claim 5 in which the kerfs are cut so that at least about 10 mm of wood remains at the second narrower edge.

8. The laminated wood product of claim 4 in which the kerfs are cut into the member from one wide face and through both narrower edges of the core member.

9. The laminated wood product of claim 8 in which the kerfs alternate so that one is cut into one wide face and the adjacent one is cut into the opposite wide face.

10. The laminated wood product of claim 8 in which the kerfs are cut so that at least about 5 mm of wood remains at the opposite wide face.

11. The laminated wood product of claim 1 in which each individual edge piece does not exceed about 25 mm in thickness.

12. A stile or rail for a paneled door made from the laminated product of claim 1.

13. A paneled door made using the stiles or rails of claim 12.

* * * * *